No. 684,495. Patented Oct. 15, 1901.
D. C. CARR.
AIR BRAKE HOSE SPLICER.
(Application filed Mar. 22, 1900. Renewed Sept. 10, 1901.)
(No Model.)
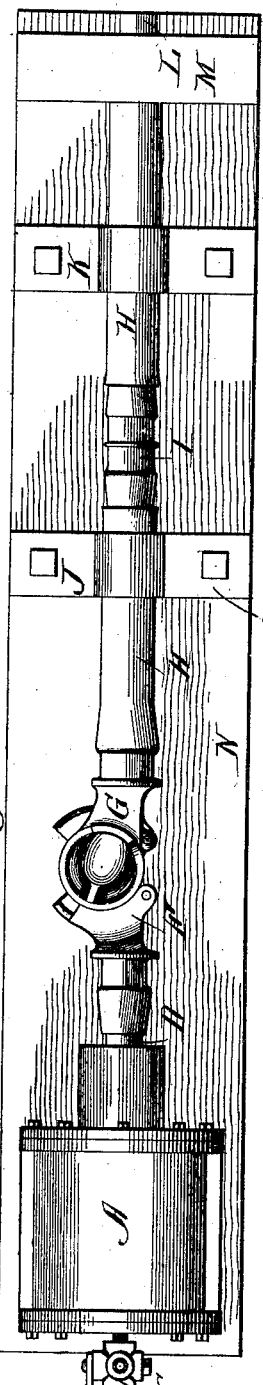
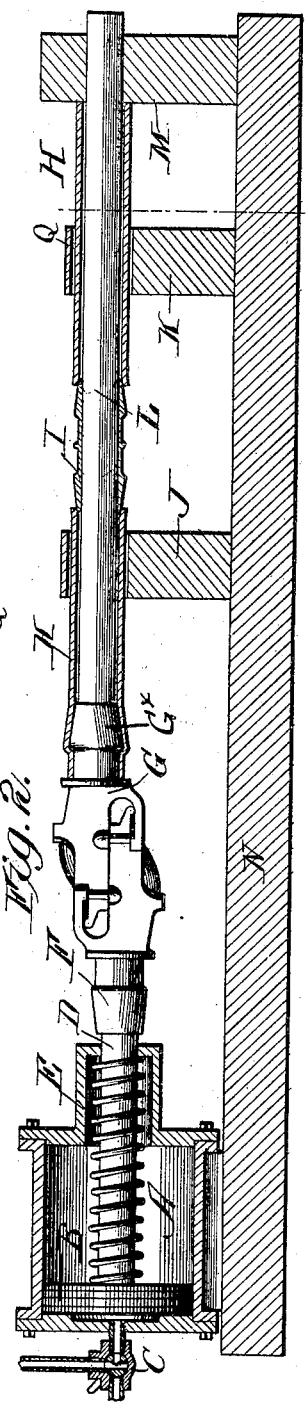
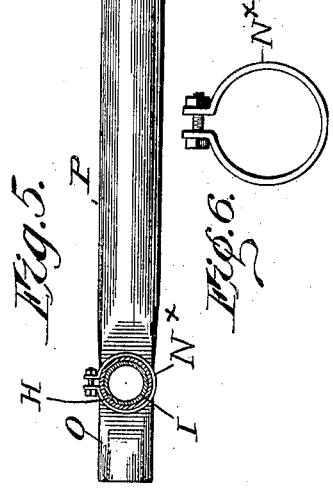
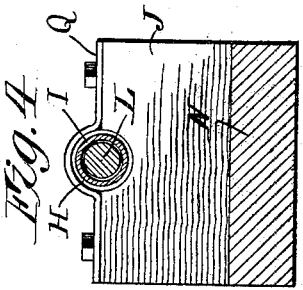
Witnesses:
Walter B. Payne.
Jessie M. Sherman.
Inventor
Delbert C. Carr,
By Geo. B. Selden,
Attorney

United States Patent Office.

DELBERT C. CARR, OF ROCHESTER, NEW YORK.

AIR-BRAKE-HOSE SPLICER.

SPECIFICATION forming part of Letters Patent No. 684,495, dated October 15, 1901.

Application filed March 22, 1900. Renewed September 10, 1901. Serial No. 74,919. (No model.)

*To all whom it may concern:*

Be it known that I, DELBERT C. CARR, a citizen of the United States, residing at Rochester, New York, have invented an Improved Air-Brake-Hose Splicer, of which the following is a specification, reference being had to the accompanying drawings.

My invention relates to an improved air-brake-hose splicer whereby the operation of repairing defective hose is materially simplified and cheapened.

My invention is fully described and illustrated in the following specification and accompanying drawings, the novel features thereof being specified in the claims annexed to the said specification.

In the accompanying drawings, representing my invention, Figure 1 is a plan view. Fig. 2 is a partial central vertical section. Fig. 3 is a longitudinal section of the joint in the spliced hose. Fig. 4 represents one of the supports for the hose. Fig. 5 represents the mechanism for compressing the clamps. Fig. 6 represents the clamp.

In the construction of my improved device for mending or splicing defective hose I employ a pressure-cylinder A, provided with a piston B and with a three-way valve C, arranged to admit steam or other fluid under pressure into the cylinder and to exhaust the same therefrom.

D is the piston-rod, attached to the piston and projecting outward from the cylinder-head. A spring E is arranged around the piston-rod to secure the return movement of the piston. The end of the spring may project into a recess on the inside of the cylinder-head, as shown in Fig. 2. On the outer end of the piston-rod is fastened the hose-coupling F, of any preferred size or style.

G indicates a coupling or coupling member joined to F. It is provided with an enlargement $G^\times$, which inserted in the hose-section temporarily fixes together the coupling and said section.

H represents the hose-sections which are to be connected or spliced, the splicing operation consisting in forcing the cut ends of the hose onto the coupling nipple or thimble I. In Fig. 2 the parts are shown in the position they occupy in the beginning of the operation, and in Fig. 3 the hose is shown as mended or spliced.

J and K represent suitable supports for the hose during the operation.

L is a rod which is inserted through the hose and the coupling-nipple before the operation is begun.

M is an abutment which receives the thrust or pressure from the end of the hose.

The coupling-nipple I consists of a short piece of pipe of any suitable material, and it may be provided around its outside with suitable grooves into which the hose is forced by any suitable clamps.

N represents the bed of the machine, which may be of any suitable material or dimensions.

Q is a strap which may be used on the supports to hold the hose in place.

In the operation of my improved hose-splicer the rod L is inserted through the coupling-nipple and the hose is arranged in the supports J and K, being provided at one end with the coupling G, which is engaged with the coupling F on the end of the piston-rod, and suitable fluid-pressure being then admitted to the cylinder the piston is forced toward the right and the cut ends of the hose are caused to slide over the coupling-nipple until they meet, as represented in Fig. 3. The coupling-nipple is held in place and the hose prevented from shifting laterally by the interior rod L.

In order to compress the clamps on the hose after it has been spliced, I remove the coupling F and substitute for it the part O, Fig. 5, having a circular recess in its outer end, and a similar recessed part P, attached to a rod or pipe, is placed in the supports J and K and rests against the block M. The spliced hose being provided with a clamp $N^\times$ is inserted between the parts O and P, and they are forced together by the pressure in the cylinder, so as to compress the clamp-ring and permit the insertion of the bolt or other fastener by which the clamp is fastened on the hose and the hose secured to the coupling-nipple.

By means of my invention the splicing of old or defective hose is accomplished rapidly and cheaply, thus saving pieces of hose which are damaged at one end only and performing quickly and effectively by machinery an operation only heretofore performed by hand.

I claim—

1. In a hose-splicer, supports for separate hose-sections, a thrust-block to hold a section lengthwise, a rod set in the sections, and means to force the sections onto an intermediate thimble.

2. The herein-described hose-splicer comprising the cylinder, piston and piston-rod, means to connect the piston-rod to a hose-section, supports for hose-sections to be spliced, the thrust-block to hold one of the sections lengthwise, and the interior rod L situated in two hose-sections.

3. The herein-described hose-splicer comprising the cylinder, piston and piston-rod, means to connect the piston-rod to a hose-section, the spring for returning the rod, supports for hose-sections to be spliced, the thrust-block to hold one of the sections lengthwise, and the interior rod L situated in two hose-sections.

4. In a hose-splicer, supports for separate hose-sections, a thrust-block to hold a section lengthwise, a rod set in the sections, a cylinder, a piston having a rod, a coupling to connect the piston-rod and a hose-section, said coupling having an enlargement whereby it may be fixed in the proximate hose-section by expansion of the latter.

DELBERT C. CARR.

Witnesses:
   GEO. B. SELDEN,
   J. M. SHERMAN.